Nov. 30, 1926. 1,609,075
W. L. EVANS
SPEED REDUCTION GEARING
Filed Sept. 16, 1925
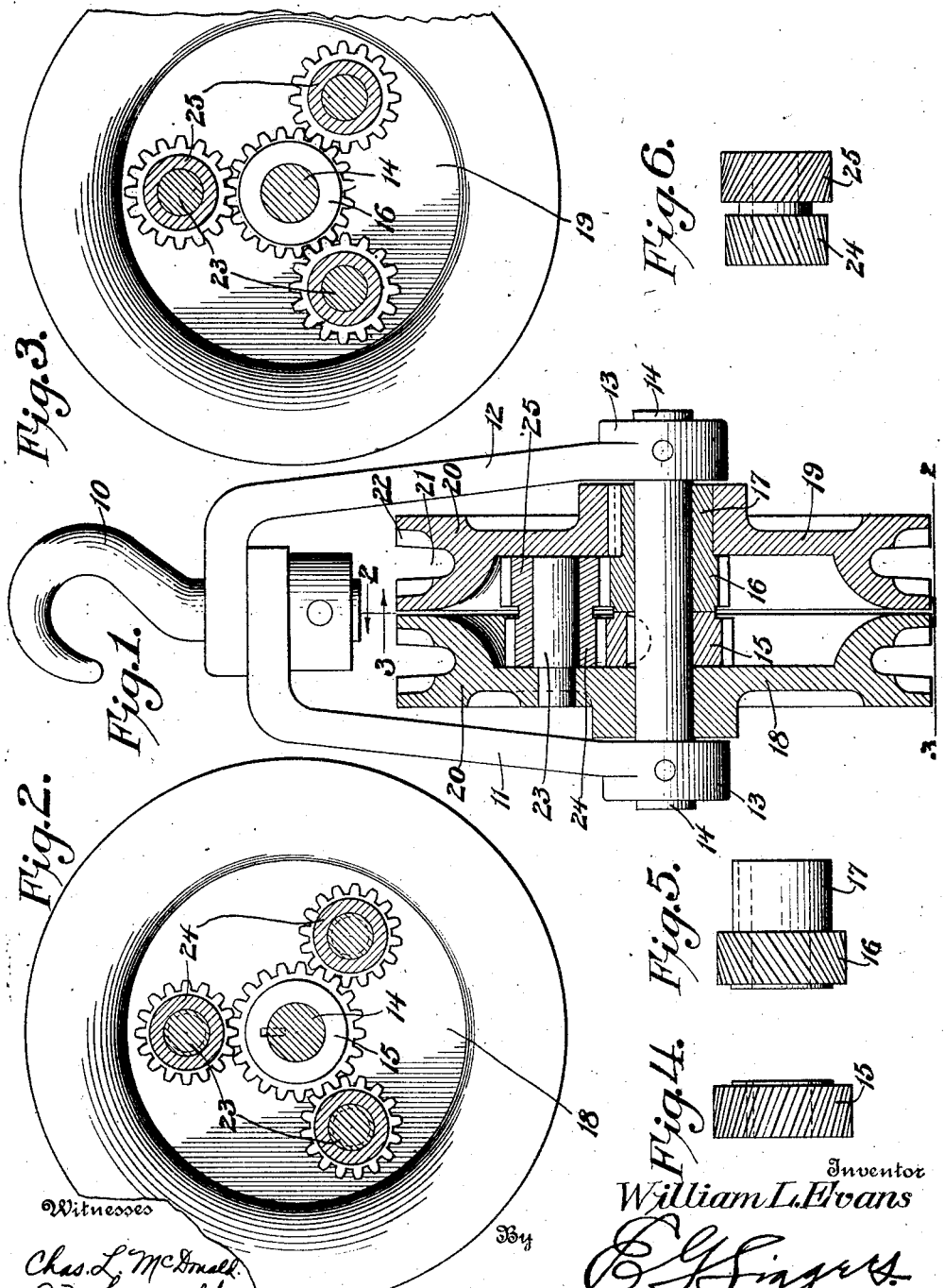

Patented Nov. 30, 1926.

1,609,075

UNITED STATES PATENT OFFICE.

WILLIAM LEWIS EVANS, OF WASHINGTON, INDIANA.

SPEED-REDUCTION GEARING.

Application filed September 16, 1925. Serial No. 56,724.

This invention relates to speed reduction gearing, especially adapted to be used in hoisting tackle, or other devices where power is to be transmitted from one rotating or rectilinearly moving part to another.

The general object of the invention is to provide a simple and practical arrangement of gearing comprising one element to which power is applied, and another element from which the power is delivered, both of said elements being rotatably mounted on the same fixed shaft, and operatively connected to each other, so that one rotates at considerably less speed than the other.

The objects of the invention and the principles of its operation will be more fully explained in connection with the accompanying drawing, which illustrates one embodiment thereof.

In the drawing:—

Figure 1 is a central vertical section taken longitudinally of the shaft on which the gearing is mounted.

Figure 2 is a section taken on the line 2—2 of Figure 1.

Figure 3 is a section taken on the same plane as Figure 2, but looking in the opposite direction as indicated by the arrows 3—3 in Figure 1.

Figure 4 is a detail view of one of the central gears.

Figure 5 is a detail view of the other central gear.

Figure 6 is a detail view of one of the planetary gears.

The invention, in the form herein shown and described, is adapted to be suspended by means of a hook 10, or the like, on which are swivelled a pair of depending opposed arms 11 and 12, having collars 13 at their lower ends in which is secured a shaft 14. A central gear 15 is keyed to the shaft 14, and adjacent thereto is another central gear 16 having an outwardly projecting hub 17. A pulley 18 is journaled on the shaft 14 between the gear 15 and the arm 11, and a second pulley 19 is fixed on the hub 17 between the toothed portion of the gear 16 and the arm 12. The pulleys 18 and 19 are formed with opposed rims 20, each having a circumferential groove 21 adapted to receive a chain, cable or the like. As shown in the drawing, the sides of the groove 21 may be provided with lugs 22 for engaging the links of a chain. The pulleys 18 and 19 with their rims 20 form a housing, enclosing a space within which the gears are located. One of the pulleys, as 18, carries one or more gudgeons 23, which extend across the space enclosed by the housing, and are disposed in parallel relation to the shaft 14 and equidistant therefrom. Each gudgeon has a double planetary gear rotatably mounted thereon, consisting of two gear elements 24 and 25, integrally or otherwise secured to each other.

In the operation of the invention, the pulley 18 is rotated by means of a chain, or the like, passing about the pulley in the groove 21, and through the medium of the gears 15, 24, 25 and 16, the pulley 19 is rotated at a reduced speed. This movement of the pulley 19 may be used for hoisting or hauling through the medium of a chain passing about the same. The pulley 18, therefore, constitutes a drive member, and the pulley 19 a driven member.

Assuming that each of the planetary gear elements 24 and 25 has the same number of teeth, sixteen, for example, and that the central gear 15 has twenty-one teeth, while the central gear 16 has only twenty teeth, each complete rotation of the pulley 18, or each complete circuit of the planetary gears will cause the central gear 16 to be rotated in the opposite direction a distance of one tooth, with a corresponding movement of the pulley 19. The pulley 19, therefore, will be driven in a direction opposite to the rotation of the pulley 18, and with a speed reduction ratio of 20 to 1.

It will be understood that the same arrangement of gearing may be used in any type of hoist or elevator, or in transmitting motion from one rotating element to another. The number of teeth in the different gears may, of course, be varied to obtain any desired ratio of speed reduction.

It is not expedient to use spur gears in gearing arranged in this manner, for the reason that the number of teeth on a spur gear can not be increased or diminished without a corresponding change in the pitch diameter, or in the diametral pitch. Consequently, if spur gears are used, either a fractional pitch must be adapted, or the central gears 15 and 16 will not mesh properly with the respective planetary gears 24 and 25, and there will be lost motion between the same, resulting in excessive noise and wear. To obviate this difficulty, it is necessary to use helical gears.

In order to increase the pitch diameter of a helical gear, and at the same time retain the same number of teeth and the same normal diametral pitch, it is only necessary to increase the angle of the teeth, and conversely, to make the gear of less pitch diameter, it is only necessary to decrease the angle of the teeth. In the central gear 16, therefore, having 20 teeth, the angle of the teeth is made greater than the angle of the teeth in the central gear 15, which has twenty-one teeth. As a consequence, the angle of the teeth in each of the planetary gear elements 25 must be greater than that of the teeth in the gear elements 24, in order that the teeth in all of the planetary gears may mesh properly with the teeth of the respective central gears. In order, therefore, to retain the same number of teeth in each of the planetary gear elements 24 and 25, the diameters of the gear elements 24 must be less than the diameters of the gear elements 25, and consequently the diameter of the central gear 16 must be less than the diameter of the central gear 15.

It is also obvious that if the number of teeth in the central gear 16 differs by one from the number of teeth in the central gear 15, there can be only one point in the circumference when the teeth of these two gears will register with each other at any one time. In one of the planetary gears, therefore, the gear elements 24 and 25 are so arranged that the teeth are in registry, while on the second planetary gear the two elements 24 and 25 are so arranged that the teeth of one are offset circumferentially a distance of one-third of a tooth from the corresponding teeth on the other element, and on the third planetary gear they are offset a distance of two-thirds of a tooth. By constructing the planetary gears in this manner, they may be arranged at approximately equal distances from each other, and will mesh properly with the respective central gears 15 and 16. If more than three planetary gears are used, the relative positions of the gear elements 24 and 25 are correspondingly altered.

A great number of planetary gears may be used, or one such gear may be sufficient if it is not subjected to too great a strain. The specific construction and relative arrangement of the various other elements of the invention may also be considerably modified without any material departure from the essential principles of the invention or sacrificing any of its advantages. It is my purpose, therefore, to include all such modifications within the scope of the appended claims.

What is claimed is:—

1. The combination with a relatively fixed shaft, of a central helical gear keyed to said shaft, a second central helical gear journaled on the shaft and having an outwardly projecting hub, one of said central gears having a different number of teeth than the other, a pair of pulleys, one journaled on the shaft and the other keyed to said hub, said pulleys having opposed rims forming a housing for the gears, one or more gudgeons mounted in the rotatable pulley and extending across the space within the housing, and a planetary gear mounted on each gudgeon and having two rigidly connected helical gear elements meshing with the respective central gears, each of said planetary gear elements having the same number of teeth as the others, said central gears and planetary gear elements all having the same normal diametral pitch.

2. The combination with a relatively fixed shaft, of a central helical gear keyed to said shaft, a second central helical gear journaled on the shaft and having an outwardly projecting hub, one of said gears having a different number of teeth than the other, a drive member journaled on the shaft adjacent the first gear, a driven member keyed to said hub, one or more gudgeons mounted on the drive member parallel to the shaft, and a planetary gear mounted on each gudgeon and having rigidly connected helical gear elements meshing with the respective central gears, all of said central gears and planetary gear elements having the same normal diametral pitch.

3. The combination with a plurality of individual helical gears, each having a different number of teeth, of a planetary gear having a plurality of helical gear elements rigidly connected together in axial alinement and meshing with the respective individual gears, all of said individual gears and planetary gear elements having the same normal diametral pitch.

4. The combination with two individual helical gears, one having a greater number of teeth and having teeth of less angle than the one with the lesser number of teeth, of a planetary gear having a plurality of helical gear elements meshing with the respective individual gears, the planetary gear element which meshes with the larger individual gear having the same number of teeth, but of smaller diameter than the other planetary gear element, said planetary gear elements and said individual gears all having the same normal diametral pitch.

5. The combination with a relatively fixed shaft, of a central helical gear keyed to said shaft, a second central helical gear journaled on the shaft and having an outwardly projecting hub, one of said central gears having a different number of teeth than the other, a pair of pulleys, one journaled on the shaft and the other keyed to said hub, said pulleys having opposed rims and forming a housing for the gears, a planetary gear carried by the rotatable pulley within the housing and having helical gear elements rigidly connected together in axial alinement and meshing with the respective central gears, each of said planetary gear elements having the same number of teeth, said central gears and said planetary gear elements all having the same normal diametral pitch.

6. The combination with a relatively fixed shaft, of a central helical gear keyed to said shaft, a second central helical gear journaled on the shaft and having an outwardly projecting hub, one of said central gears having a different number of teeth than the other, a pair of pulleys, one journaled on the shaft and the other keyed to said hub, a planetary gear carried by the rotatable pulley within the housing and having two helical gear elements meshing with the respective central gears, the central gear which has the greater number of teeth having teeth of less angle than the other central gear, the planetary gear element which meshes with the larger central gear having the same number of teeth but a smaller diameter than the other planetary gear element, said central gears and planetary gear elements all having the same normal diametral pitch.

7. The combination with two individual helical gears, one having a greater number of teeth and the teeth being of less angle than the other, of a plurality of planetary gears, each having two helical gear elements meshing with the respective individual helical gears, one of said planetary gears having the teeth of one element in registry with the teeth of the other element, and the remaining planetary gears having the teeth of one element circumferentially offset with respect to the teeth of the other element to correspond to the relative positions of the teeth in the individual gears where said planetary gears are to be located, said planetary gear elements and said individual gears all having the same normal diametral pitch.

8. The combination with a relatively fixed shaft, of a central helical gear keyed to said shaft, a second central helical gear journaled on the shaft and having an outwardly projecting hub, one of said central gears having a different number of teeth than the other, a pulley journaled on the shaft adjacent the first gear, a second pulley keyed to said hub, a plurality of gudgeons mounted on the first pulley parallel to said shaft, and a planetary gear mounted on each gudgeon and having two rigidly connected helical gear elements meshing with the respective central gears, one of said planetary gears having the teeth of one element in registry with the teeth of the other element, and each of the other planetary gears having the teeth of one element circumferentially offset with respect to the teeth of the other element to correspond to the relative positions of the teeth on the central gears where said planetary gears are to be located, said central gears and planetary gear elements all having the same normal diametral pitch.

In testimony, that I claim the foregoing as my own, I have hereto affixed my signature.

WILLIAM LEWIS EVANS.